(12) United States Patent
Manor

(10) Patent No.: US 7,308,946 B2
(45) Date of Patent: Dec. 18, 2007

(54) METHOD OF CLEANING HOLE DIGGERS AND SPOT CULTIVATORS AND HOLE DIGGER CLEANING DEVICE

(76) Inventor: Gedalyahu Manor, 15 Adam Hacohen Street, Haifa 32714 (IL)

( * ) Notice: Subject to any disclaimer, the term of this patent is extended or adjusted under 35 U.S.C. 154(b) by 64 days.

(21) Appl. No.: 10/508,919

(22) PCT Filed: Apr. 3, 2003

(86) PCT No.: PCT/US03/10491

§ 371 (c)(1),
(2), (4) Date: Sep. 23, 2004

(87) PCT Pub. No.: WO03/086042

PCT Pub. Date: Oct. 23, 2003

(65) Prior Publication Data

US 2005/0161237 A1    Jul. 28, 2005

(51) Int. Cl.
    *A01B 79/00*    (2006.01)
(52) U.S. Cl. .............. 172/1; 172/52; 172/60; 172/108; 172/123; 172/125; 37/189
(58) Field of Classification Search .......... 172/1, 172/48, 60, 108, 123, 125, 103, 51, 52; 37/189; 299/10, 39.9, 39.4, 39.1; 111/900
See application file for complete search history.

(56) References Cited

U.S. PATENT DOCUMENTS

| | | | |
|---|---|---|---|
| 3,255,829 A * | 6/1966 | Smith | 172/108 |
| 3,714,990 A | 2/1973 | Tomik | |
| 4,162,102 A * | 7/1979 | Rooymans | 299/10 |
| 4,732,227 A | 3/1988 | Wolf et al. | |
| 6,164,384 A | 12/2000 | Manor | |
| 6,662,889 B2 * | 12/2003 | De Fazio et al. | 180/22 |

* cited by examiner

*Primary Examiner*—Thomas B. Will
*Assistant Examiner*—Jamie L McGowan
(74) *Attorney, Agent, or Firm*—Frishauf, Holtz, Goodman & Chick, P.C.

(57) ABSTRACT

A travelling rolling digger (1) for sequential hole drilling or for producing sequential cultivated spots in soil. The travelling rolling digger (1) includes at least one drilling shaft which is rotatable by a drive mechanism about a longitudinal shaft axis and has a rotating soil penetrating edge. The drilling shaft is mounted to roll about a horizontal shaft in a soil penetrating plane while the horizontal shaft moves in a direction of travel of the traveling rolling digger. The rotating drilling shaft enters the soil at an entry angle and digs into the soil while the horizontal shaft moves in the direction of travel and the drilling shaft continuously changes its angle relative to the soil from the entry angle to a vertical position. The traveling rolling digger further comprising at least one cleaning blade (6).

17 Claims, 18 Drawing Sheets

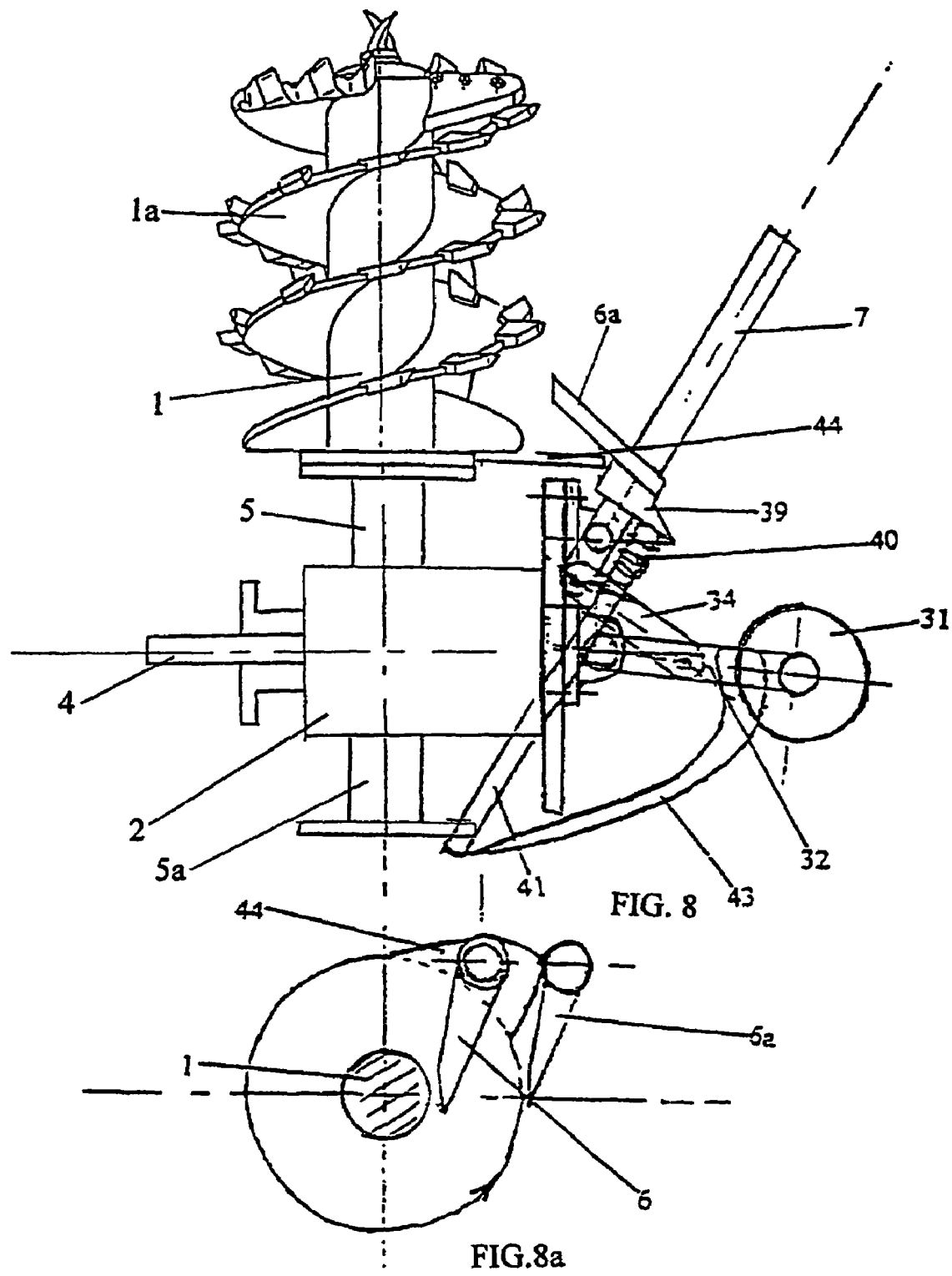

METHOD OF CLEANING HOLE DIGGERS AND SPOT CULTIVATORS AND HOLE DIGGER CLEANING DEVICE

BACKGROUND OF THE INVENTION

The present invention relates to a method and devices for cleaning hole diggers and spot cultivators from accumulated mud, which interfere with the digging or cultivating process. It is specially related to rolling hole diggers and spot cultivators as their high rate of digging or cultivating holes is very fast. As the time between holes is very short, it is important to prevent the accumulation of mud mechanically and not cleaning by time consuming and hard manual cleaning. The accumulated mud around hole digging and spot cultivating blades and shafts includes weeds, roots and other debris. The combination of mud with the string-like debris makes it very hard to clean, unless it is being cleaned immediately after digging each hole. The present invention thus provides a simple procedure and devices for cleaning hole diggers and spot cultivators automatically while they are being moved from one hole to the new one.

It is an object of the invention to provide a method and apparatus for cleaning hole diggers and spot cultivators automatically while they are being moved from one hole to the new one. The method is specially beneficial for fast moving hole diggers and spot cultivators like the fast hole diggers (U.S. Pat. No. 4,732,229) and the rolling spot cultivators (U.S. Pat. No. 6,164,384) both of them were invented by the present inventor or including him with others which are hereby incorporated by reference.

SUMMARY OF THE INVENTION

The invention provides a method for cleaning hole diggers and spot cultivators automatically while they are being moved from one hole to the new one. The cleaning method is using at least one automatic stationary cleaning blade, stationary shaft covering sleeves and counter rotating blades, all of them or any combination of part of them to fit the construction of the digger or spot cultivator (The term "stationary" in this application means nonrotatable relative to the rotating shaft or rotating auger).

The at least one automatic stationary-cleaning blade is cutting the accumulated mud and debris as soon as the digging shaft is above the ground after digging a hole. The stationary shaft covering sleeves prevent the accumulation of mud and debris around the rotating shafts above the rotating blades of the digger. The counters rotating blades cut the debris and prevent them from accumulating with mud.

In one preferred embodiment the at least one stationary cleaning blade is mounted on the main gearbox of a post hole digger by a pivoted arm. A depth-gage wheel or sledge is running on the ground surface at the rear side of the gearbox. The wheel is mounted to the main gearbox by another pivoted arm. The two pivoted arms are linked in such a way that the stationary cleaning blade is pulled backwards and above the ground when the digging shaft is entering the soil. After the digging operation, the post hole digger is lifted up by its lifting system which mounted it onto an operating vehicle. The operating vehicle moves with the post hole digger to the location of the new hole. The gage wheel is moving forward and pushing the at least one stationary cleaning blade to the rotating digging shaft. The at least one stationary cleaning blade cuts off the mud and debris which were accumulated on the digger while digging the last hole, thus the clean digger is ready for digging the new hole. The digger may be an auger for digging out a clean hole or a spot cultivator, which cultivates the soil in the hole with at least one rotating blade and leaves the soil in the hole.

In another preferred embodiment, the at least one stationary cleaning blade is pivotally mounted on the main gearbox of a rolling spot cultivator. The at least one stationary cleaning blade is pushed at the digger and cuts off the mud and debris which were accumulated on it while digging the last hole as soon as the digger rolls upward from the hole. The automatic mechanism to push the at least one cleaning blade to the digger in its upward position and to lift it above the ground in the digging position is using a mass and pivoted arms. The automatic mechanism for changing the at least one cleaning blade positions is mounted at the side of the rolling gearbox of the machine and rolls with it. The operating mass is mounted on at least one pivoted arm, which lets it fall downward whenever the gearbox rolls around its horizontal axes which rolls the digger shaft upward after digging the hole. The at least one pivoted arm of the mass is linked to the at least one pivoted stationary arm of the at least one cleaning blade in such a way that it lifts the arm and the blades above the ground in the digging position of the digger. In the upper position of the digger the mass pushes the arm and the blades to the rotating digger. Thus the digger is being cleaned after each hole and is ready to dig the new hole. The digger may be an auger for digging out a clean hole or a spot cultivator, which cultivates the soil in the hole with at least one rotating blade and leaves the soil in the hole.

In a special preferred embodiment to clean an auger-digger, the at least one cleaning blade can slide along its pivoted arm. As the cleaning blades enter between the auger's flights, they are being pushed by the flights to their ends sliding along the pivoted arm. In order to prevent breakage, the blades with their arms are pushed out of the auger flights by a cam rotating with the auger.

In another special preferred embodiment to clean an auger-digger, the at least one cleaning blade can slide along its pivoted arm pushing a rod against a spring. As the cleaning blades enter between the auger's flights, they are being pushed by the flights to their ends. In order to prevent breakage, the rod pushes and slides along a curved rail. The curved rail is mounted on the arm of the mass and lifts the mass upward, which results in pulling the blades with their arms out of the auger flights. The spring slides back the at least one cleaning blade and the rod to its starting cleaning position as the mass moves downward.

In another preferred embodiment the rotating shafts are covered by stationary covering sleeves. The stationary covering sleeves are mounted on the main gearbox of the post hole digger or the rolling spot cultivator. On the other side the sleeves are connected to bearing housings on the end of the shafts. The bearings allow the cultivator shafts and blades to rotate and cultivate the soil while the sleeves prevent the build-up of mud and debris around the shafts above the blades. The cultivating blades are mounted to the shafts and secured, preferable by pins or bolts.

In another preferred embodiment the lower cultivating blades are rotating in the opposite direction to the upper portion of the digger, which has the auger flights or the upper set of cultivating blades. The counter rotating blades cut the debris and prevents them from accumulating with mud on the blades and the shaft between them. The driving pinion in the main gearbox is rotating two gears, one of them in one direction, and the other one in the counter direction. One of the gear wheels is connected to hollow shaft and rotates it in one direction, and the other gear wheel is connected to an inner shaft and rotates it to the counter direction The digger's hollow shaft is mounted to the hollow shaft of the gearbox by flanges (as an example) to rotate with it. The upper set of blades or auger flights is mounted to the hollow shaft by hollow pins, or bolts, around it, or welded to it, and rotates with it in one direction. The inner shaft of the digger is mounted to the inner shaft of the gearbox and rotates with it in the counter direction. The lower set of blades is mounted to the inner shaft of the digger and rotates with it in the counter direction to the upper set of blades or flights. The counter rotating blades prevent the mud and debris from accumulating between the blades. The stationary sleeve is mounted to the main gearbox and connected at its other lower end to the bearing housing on the hollow shaft of the digger to prevent the accumulation of mud and debris on the hollow shaft.

BRIEF DESCRIPTION OF THE DRAWINGS

FIG. 8 is a rear view of an auger digger mounted on a rolling gearbox in its upper position with a stationary cleaning blade at its side at the end of a cleaning operation, pushed outside the auger flights by a curved rail. There is also an alternative cam to push the cleaning blade outside the auger flights.

FIG. 8a is a cross section of FIG. 8 showing the stationary-cleaning blade in a cleaning position, and outside the auger flight. There is also an alternative cam to push the cleaning blade outside the auger flights.

DETAILED DESCRIPTION

Figure 1:
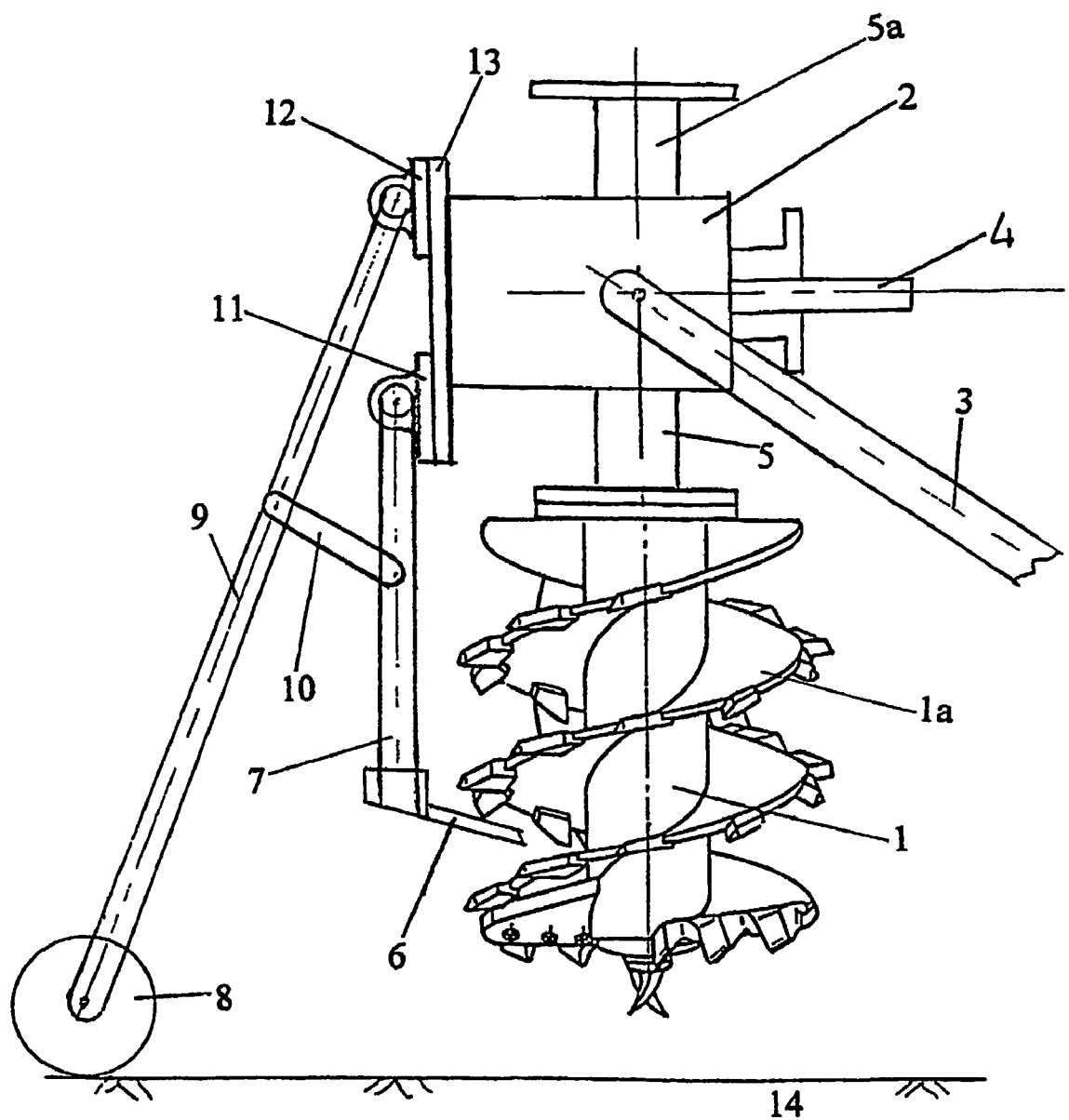
FIGS. 1, 1a, 1b are a side view of a post hole digger with an automatic stationary cleaning blades in three positions of operation.
Figure 1A:
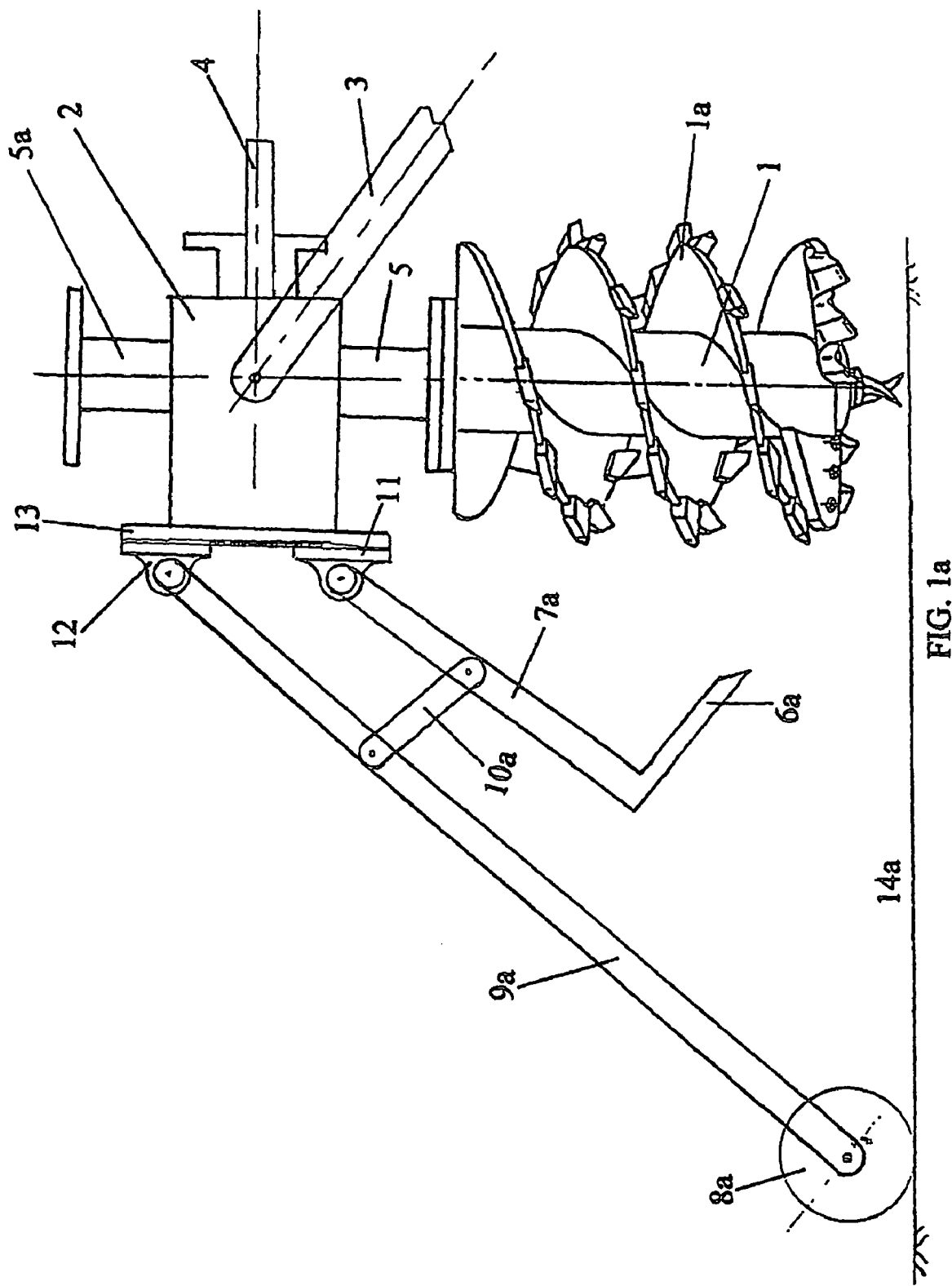
Figure 1B:
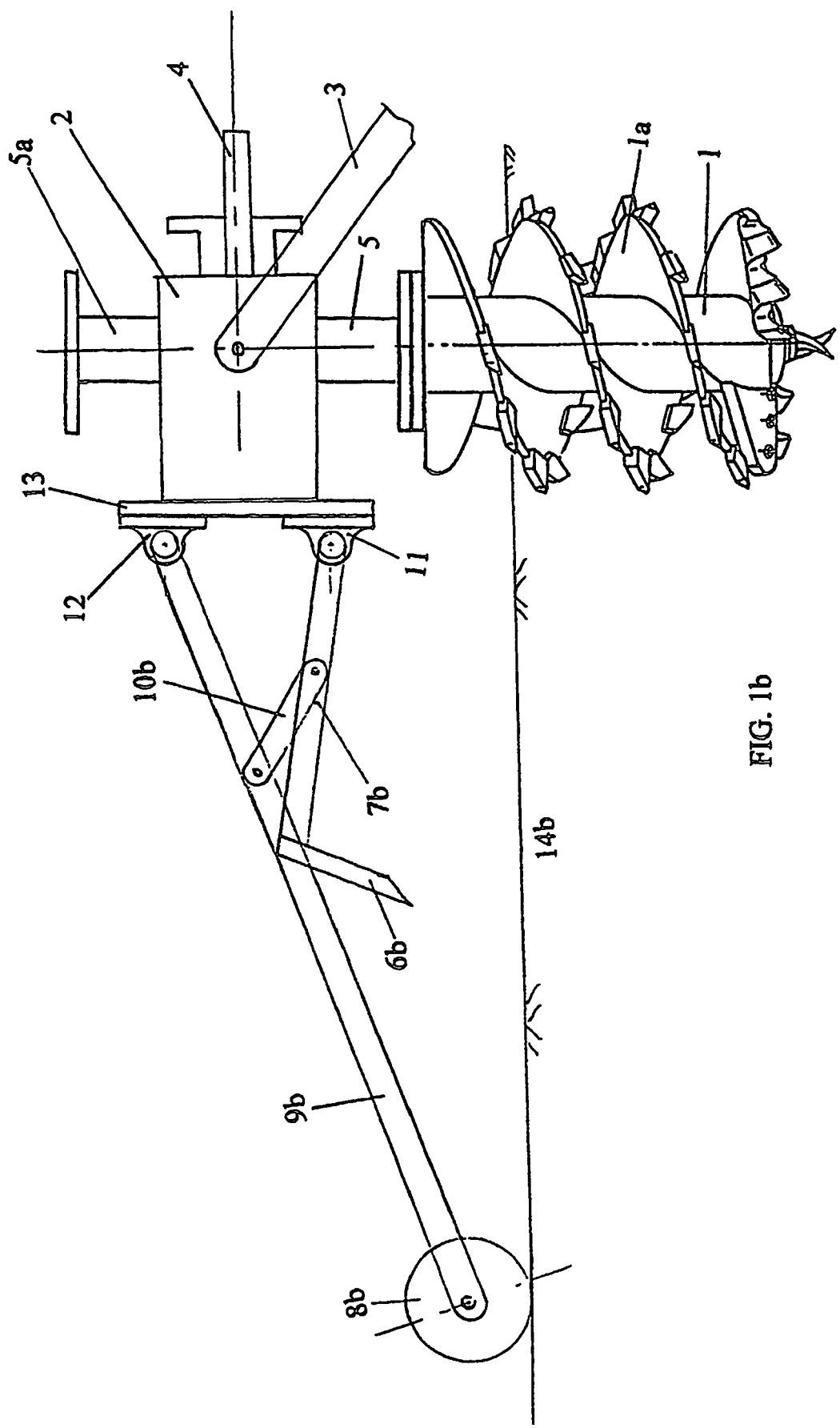

FIGS. 1, 1a, 1b are a side view of a post hole digger with an automatic stationary-cleaning blades in three positions of operation. The auger digger 1 is in three relative positions to the soil surface: in position 14 the digger is lifted by the lifting arm 3 connected to the operating vehicle, above the soil surface. The stationary-cleaning blade 6 is at its cleaning position, cleaning mud and roots and other debris from the rotating auger digger 1 while the operating vehicle moves to the next digging spot. In position 14a the auger digger is lowered by the arm 3 to touch the soil surface and the depth control wheel 8 moves backward to position 8a. By moving backward the wheel's arm 9 moves with the wheel 8a to the new position 9a. The wheel's arm 9 is connected to the stationary-cleaning blade's arm 7 by a connecting link 10. By moving to position 9a, the wheel's arm pulls the blade's arm 7, via the link 10a to its new position 7a thus pulling the stationary blade 6 outside the auger flights 1a to its position 6a. At the end of the digging operation, the auger 1 is in its maximum depth under the soil surface 14b. The wheel 8b follows the soil surface and its arm 9b and the stationary cleaning blade 6b are above the soil surface. When lifting the post hole digger by the arm 3, the stationary cleaning blade is back at its cleaning position 6, cleaning mud and roots and other debris from the rotating auger 1 while the operating vehicle moves to the next digging spot. The wheel's arm 9 and the blades arm 7 arm mounted on the main gearbox 2 of the post hole digger via bearings 12 and 11 and their base 13. The auger digger 1 is mounted to the receiving shaft 5 of the gearbox 2, which is powered by the vehicle engine, through a mechanical, hydraulical or electrical transmission (not shown) and the shaft 4.

Figure 2:
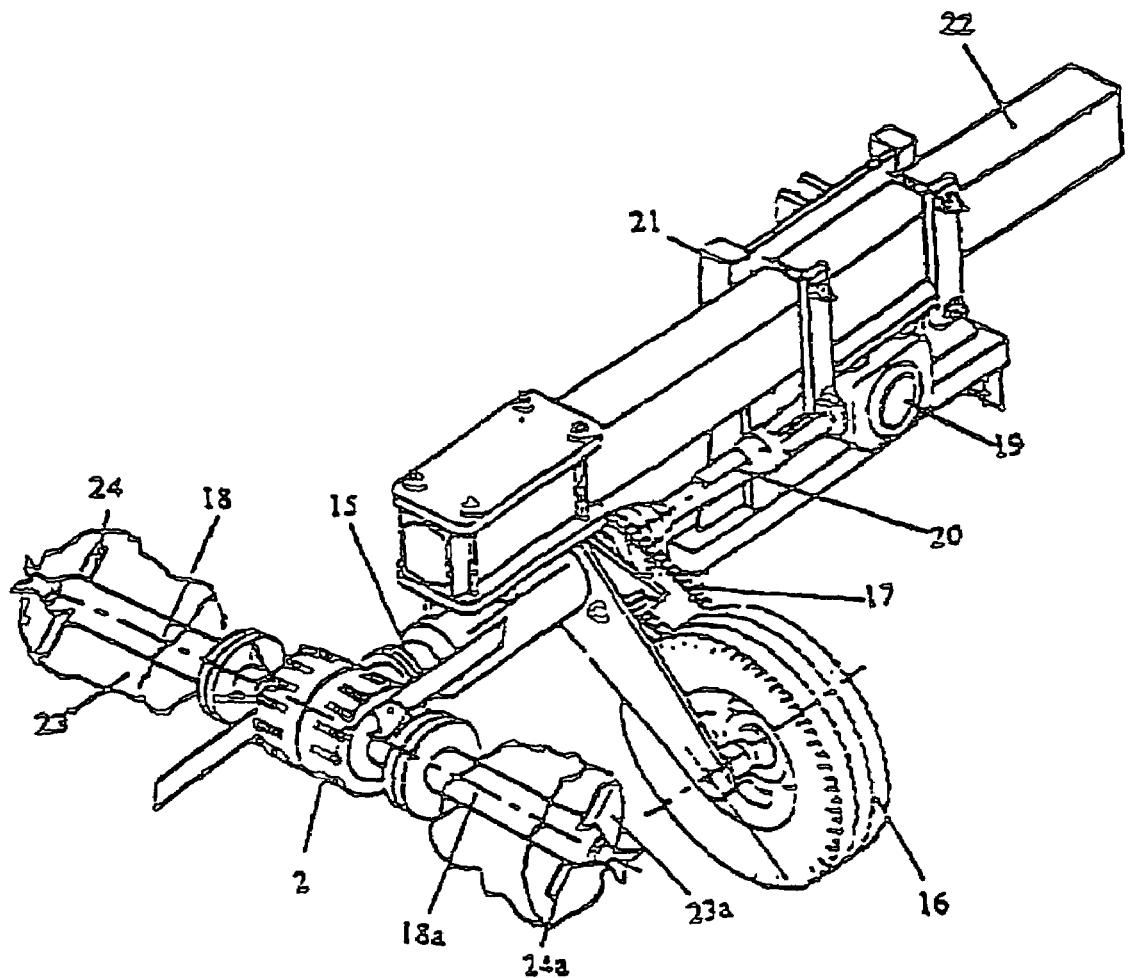
FIG. 2 is a perspective view of a rolling spot cultivator with two rolling cultivators in the same forward moving plane with mud collected on its blades and shafts.

FIG. 2 is a perspective view of a rolling spot cultivator with two rolling cultivators in the same forward moving plane, with mud 23 and 23a collected on its blades 24 and 24a and shafts 18 and 18a. The frame 21 is for mounting the rolling spot cultivator to the operating vehicle and the beam 22 is connecting the other parts to the frame. The wheel 16 is rotating the hollow shaft 15 via the chain 17. The rolling gearbox 2 is connected to the hollow shaft 15 thus rotating by the wheel 16. The power for the rolling cultivator shafts 18 and 18a is transferred from the operating vehicle via the stationary gearbox 19, the shaft 20, running inside the hollow shaft 15 to the inlet shaft 4 (not shown) and the 90 degrees gears inside the rolling gearbox 2. The vehicle moves forward thus rolling the rolling gearbox 2 forward by the wheel 15, lowering one of the shafts 18 to penetrate the ground while the rotating blades 24 pulverize the soil around the shaft 18. While rotating near, and in the soil the blades 24 accumulate mud and weeds 23 which interfere with the tilling operation. While one shaft 18 with its blades 24 till the soil downward, the other shaft 18a with the accumulated mud 23a is pointed upward free to be cleaned.

Figure 3A:
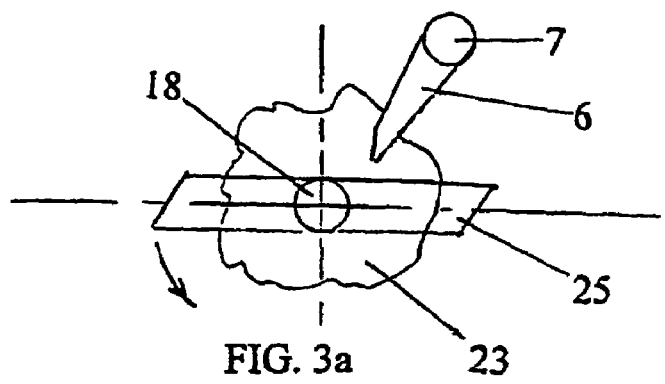
FIG. 3a is a cross section of FIG. 3 showing the stationary cleaning blade in a cleaning position, cutting the accumulated mud near the rotating cultivator blades.
Figure 3:
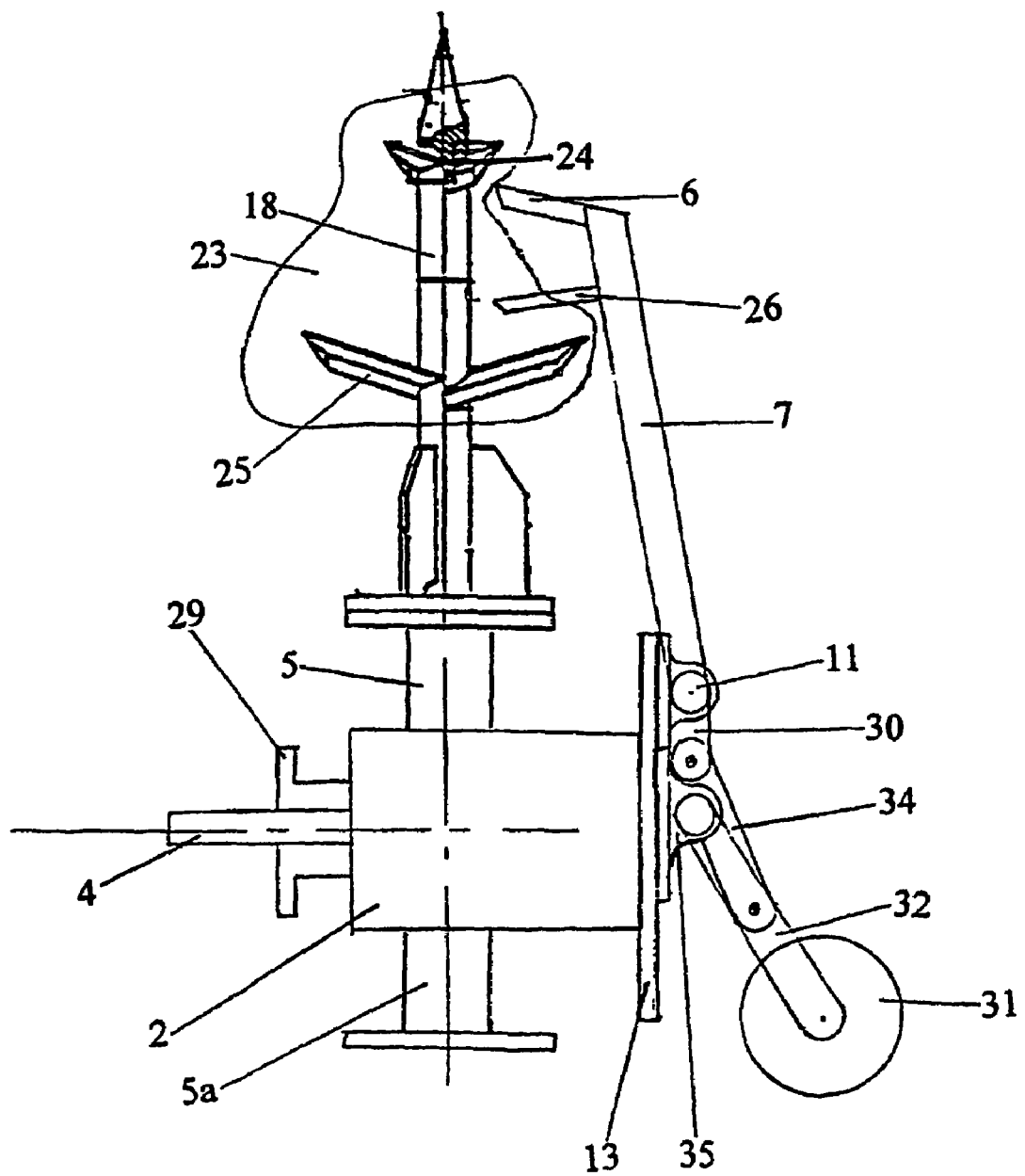
FIG. 3 is a rear view of a rolling spot cultivator shaft in its upper position with two stationary cleaning blades at its side in a cleaning position.

FIG. 3 is a rear view of a rolling spot cultivator shaft 18 in its upper position with two sets of tilling blades 24 and 25 and two stationary-cleaning blades 6 and 26 at its side in a cleaning position. The cleaning blades 6 and 26 are mounted on the blade's arm 7, which is held in the cleaning position by the mass 31 and a connecting mechanism. When the tilling shaft 18 moves upward, after tilling the soil, as the gearbox 2 is rolling, the mass 31 falls down and pushes the stationary-cleaning blades 6 and 26 into the cleaning position. The shaft 18, mounted on the out going shaft 5 powered by the inlet shaft 4 via the gears inside the rolling gearbox 2, is rotating and the stationary blades 6 and 26 cut the mud out from it. The mass 31 is mounted on arms 32, which are connected to the stationary-blades' arm 7 via the pull arm 30 and the link 34. The blade's arm 7 is mounted to the base plate 13 via the bearings 11. The arms of the mass 31 are mounted to the base plate 13 via the bearings 35. The base plate 13 is connected to the side of the rolling gearbox 2 which is mounted on the rolling hollow shaft 15 (not shown), by the flange 29, and rolls with it in a vertical plane forward.

FIG. 3a is a cross section of FIG. 3 showing the stationary-cleaning blade 6 in a cleaning position, cutting the accumulated mud 23 near the rotating cultivator blades 25 mounted on the rotating shaft 18. The blade's arm 7 is holding the stationary-cleaning blade 6 against the rotating mud 23.

Figure 4:
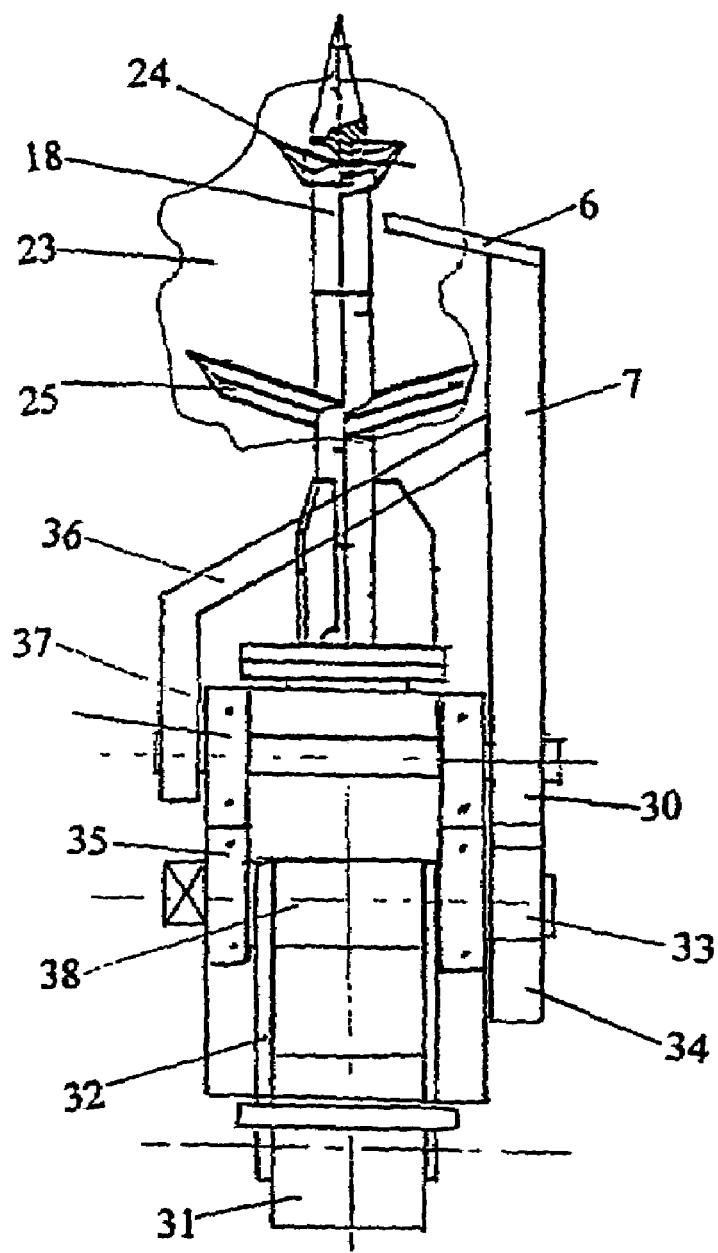
FIG. 4 is a side view of a rolling spot cultivator shaft in its upper position with one stationary cleaning blade at its side in a cleaning position.

FIG. 4 is a side view of a rolling spot cultivator shaft 18 in its upper position with one stationary-cleaning blade 6 at its side in a cleaning position. The tilling blades 24 and 25 are rotating with the shaft 18 against the stationary blade 6, which is held in place by the blade's arm 7. The blade's arm 7 is mounted to the cleaning axle 37 on one side and a strengthening arm 36 is mounted on it on the other side. A second blade's arm 7a (FIG. 7a) can be mounted instead of the strengthening arm 36. The cleaning axle 37 is mounted to the base plate 13 via the bearings 11. The mass 31 is mounted downward on arms 32, which are connected to the blades' arm 7 via the pull arm 30, the outer mass's arm 33 and the link 34. The mass's arms 32 are connected to the mass's axle 38, which is mounted to the base plate 13 via the bearings 35. The outer mass's arm 33 is mounted to the mass's axle 38 and rotates with it and with the mass 31.

Figure 4A:
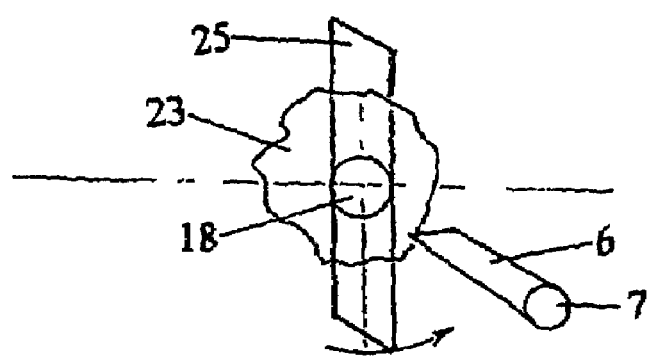
FIG. 4a is a cross section of FIG. 4 showing the stationary cleaning blade in a cleaning position, cutting the accumulated mud near the rotating cultivator blades.

FIG. 4a is a cross section of FIG. 4 showing the stationary-cleaning blade 6 mounted on the blade's arm 7 in a cleaning position, cutting the accumulated mud 23 near the rotating cultivator blades 25 and the shaft 18.

Figure 5:
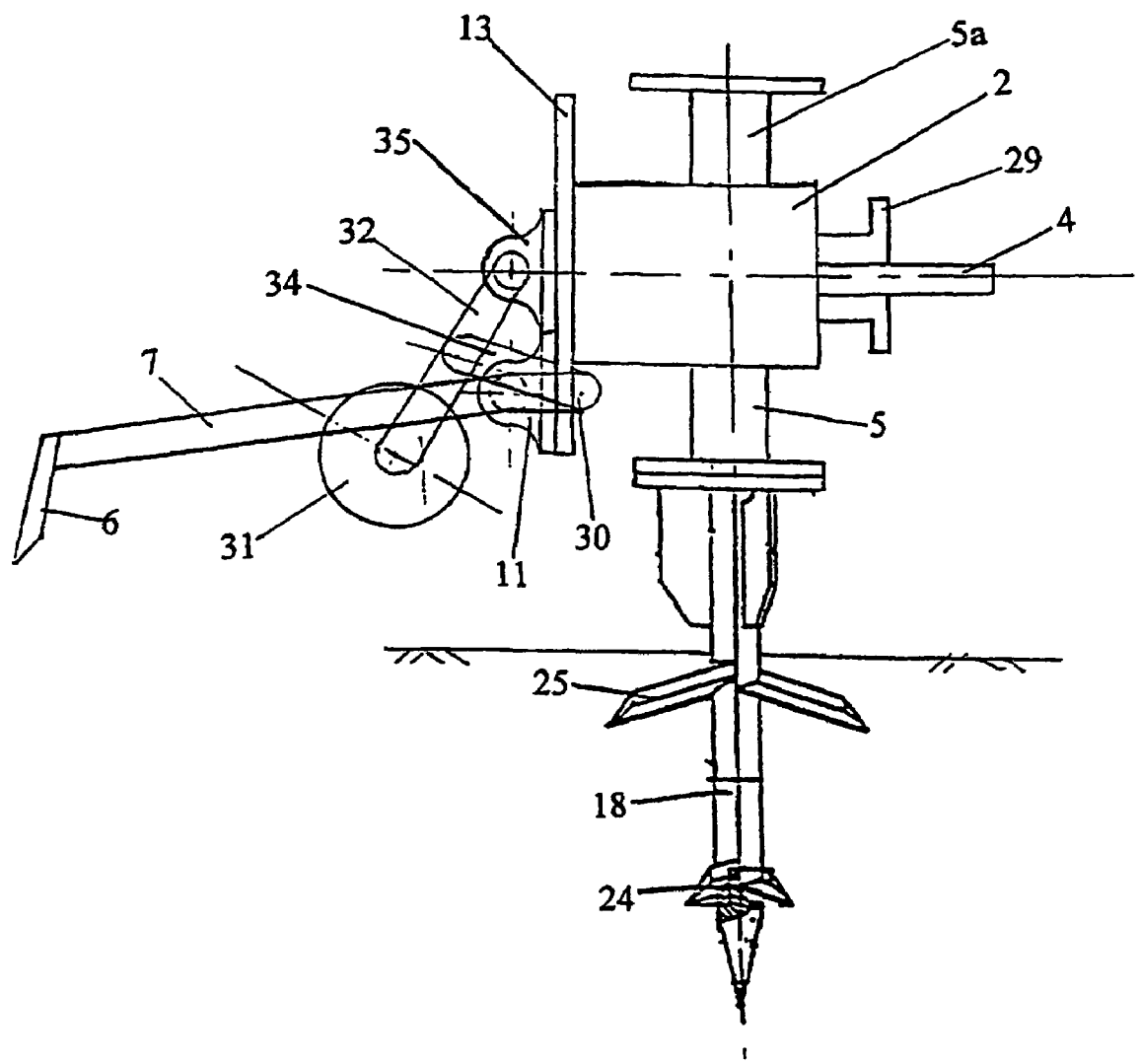
FIG. 5 is a rear view of a rolling spot cultivator shaft in its digging position with one stationary-cleaning blade at its side above the ground.

FIG. 5 is a rear view of a rolling spot cultivator shaft 18 in its digging position with one stationary-cleaning blade 6 at its side above the ground. As the gearbox 2 with the base plate 13, both mounted on the hollow shaft 15 (not shown here) via the flange 29 rolls with the tilling shaft 18 downward, the mass 31 falls down. By falling down, the mass 31 pushes the pull arm 30 by the link 34, which is connected to the outer mass's arm 33, and lifts the blade's arm 7 and the stationary-blade 6 above the ground. Thus the tilling shaft 18 and blades 24 and 25, mounted on the outgoing shaft 5, can till the soil by being powered through the inlet shaft 4.

Figure 6:
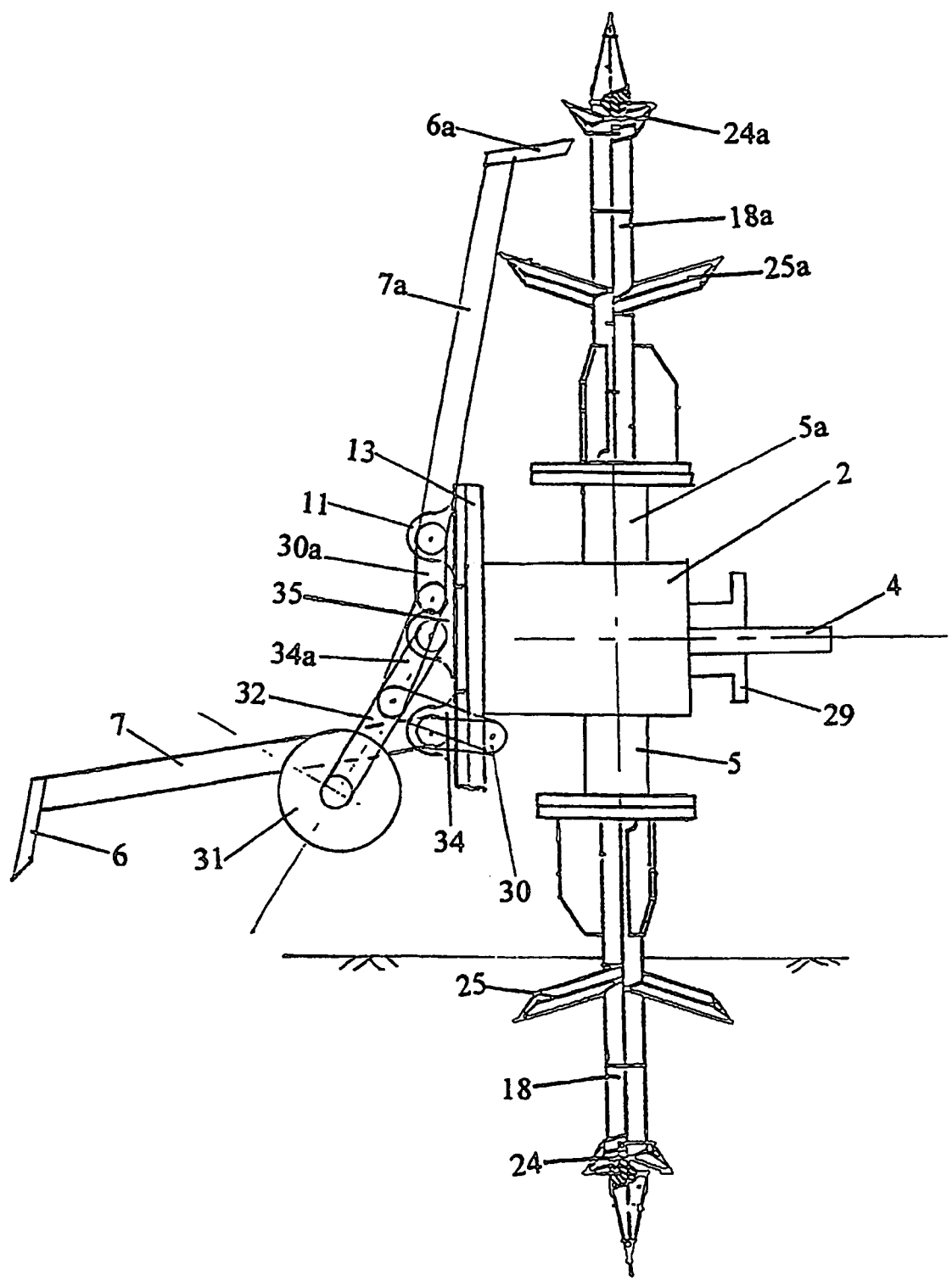
FIG. 6 is a rear view of two rolling spot cultivator shafts, one in its digging position with one stationary cleaning blade at its side above the ground and the other in its upper position with one stationary cleaning blade at its side in a cleaning position.

FIG. 6 is a rear view of two rolling spot cultivator shafts 18 and 18a, one in its digging position 18 with one stationary-cleaning blade 6 at its side above the ground. The other cultivator shaft 18a is in its upper position with one stationary-cleaning blades 6a at its side in a cleaning position. The mass 31 is in its lower position lifting up the lower stationary-cleaning blade 6 and pushing the upper stationary-cleaning blade 6a to the upper digging shaft 18a to clean the mud. By moving forward the gearbox 2 with the digging shafts 18 and 18a will roll with the rolling hollow shaft 15 as the flange 29 mounts it on it. The digging shafts 18 and 18a rotate as the vehicle engine powers them by the transmission and the inlet shaft 4. The base plate 13 rolls with the gearbox 2 thus letting the mass 31 to change positions by gravity, always lifting the lower stationary-cleaning blade 6 above the ground and pushing the upper stationary-cleaning blade 6a to the rotating upper digging shaft 18a.

Figure 7:
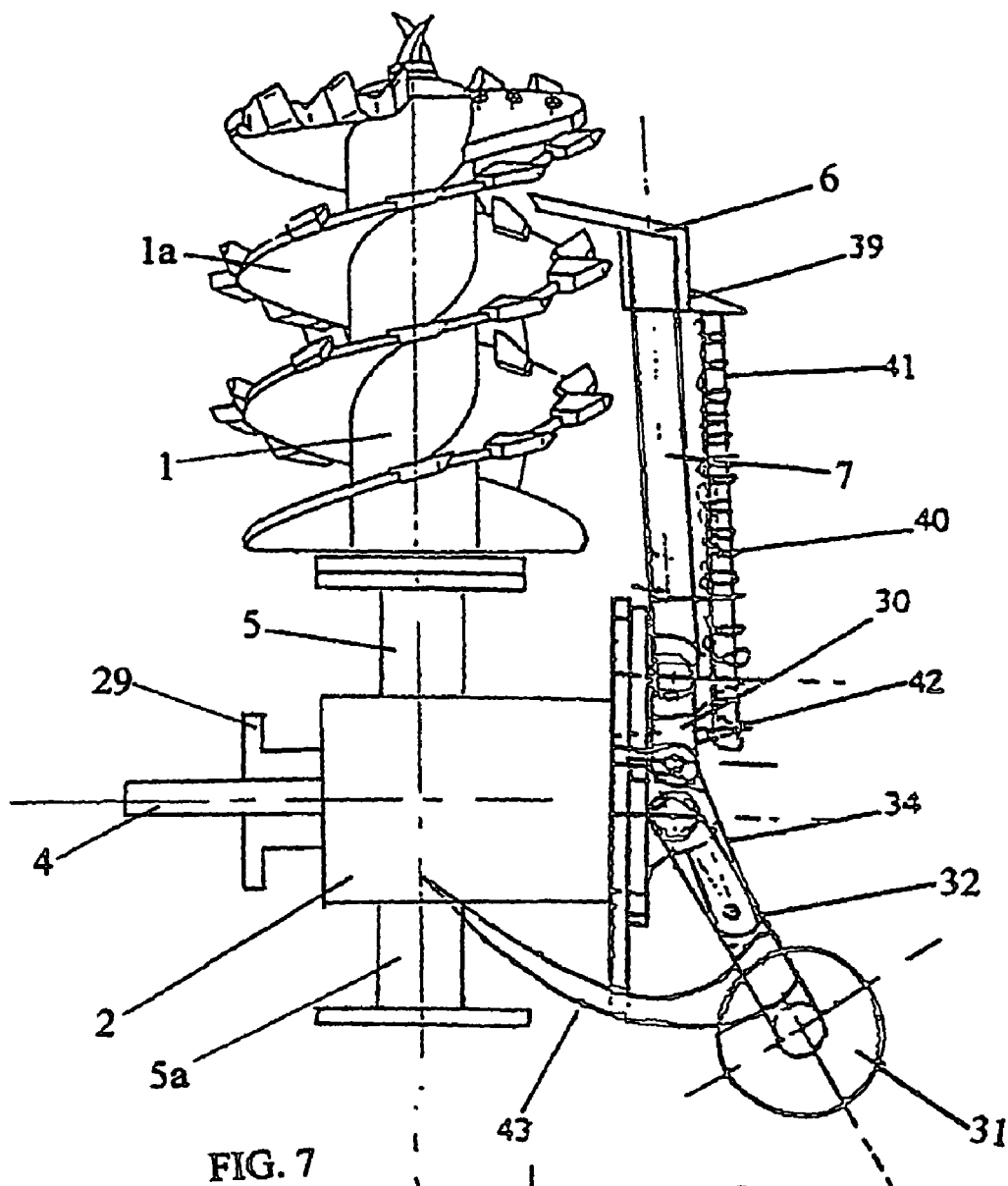
FIG. 7 is a rear view of an auger digger mounted on a rolling gearbox in its upper position with a stationary cleaning blade at its side in a cleaning position.

FIG. 7 is a rear view of a rotating auger digger 1 with two auger flights 1a, mounted on a rolling gearbox 2 in its upper position with stationary-cleaning blades 6 and 6a at its side in a cleaning positions. Each stationary-cleaning blade 6 and 6a is cleaning one flight of the auger digger 1. As the auger digger 1 rotates the auger flights 1a push the stationary-cleaning blades 6 and 6a downward sliding along their arms 7 and 7a (not seen). The sliding base 39 is connected to a rod 41 with a spring 40 around it. The spring 40 is pressed by a plate 42 mounted on the pull arm 30. The rod 41 protrudes through the plate 42. The base plate 13 rolls with the gearbox 2 thus letting the mass 31 to change positions by gravity, always pushing the upper positioned stationary-cleaning blades 6 and 6a to the rotating digging shaft 18 in its upper position to clean it.

Figure 7A:
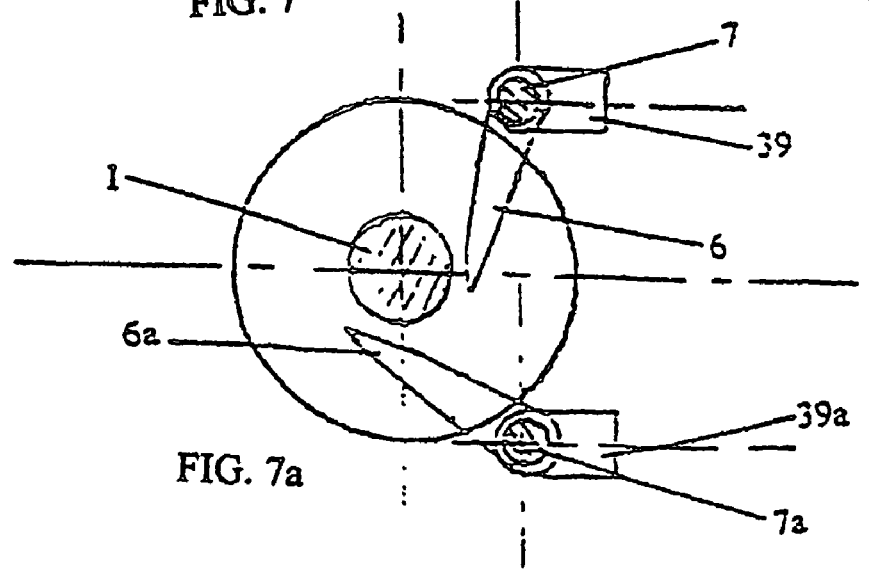
FIG. 7a is a cross section of FIG. 7 showing two stationary cleaning blades in cleaning positions, each one is mounted on a different parallel arm and cutting the accumulated mud at the rotating two auger flights.

FIG. 7a is a cross section of FIG. 7 showing two stationary-cleaning blades 6 and 6a in cleaning positions, each one is mounted on a different parallel stationary-arm 7 and 7a and cutting the accumulated mud at the rotating two auger flights 1a.

FIG. 8 is a rear view of a rotating auger digger 1 mounted on a rolling gearbox 2 in its upper position with a stationary-cleaning blade 6a at its side at the end of a cleaning operation, pushed outside the rotating auger flights 1a by a curved rail 41. There is also an alternative cam 44 to push the stationary-cleaning blade 6a outside the rotating auger flights 1a. In the cleaning operation, the stationary-cleaning blade 6a is pushed by the rotating auger flights 1a to their end. At that point the stationary-blade 6a is pushed out of the rotating auger flights 1a by a cam 44 or by the spring rod 41 as it slides along the curved rail 43. By pushing the curved rail 43, the rod 41 lifts the mass 31 half way up and pulls the stationary-blade 6*a* with its arm 7 out of the rotating auger flights 1*a*. The spring 40 slides back the stationary-blade 6*a* and the sliding base 39 to be in another cleaning operation, unless the gearbox 2 rolls down and the falling mass 31 will pull the stationary-blade 6*a* above the ground.

FIG. 8*a* is a cross section of FIG. 8 showing the cleaning blade 6 in a cleaning position and cleaning blade 6*a* outside the auger flight 1*a*. There is also an alternative cam 44 to push the stationary-cleaning blade 6*a* outside the auger flights 1*a*.

Figure 9:
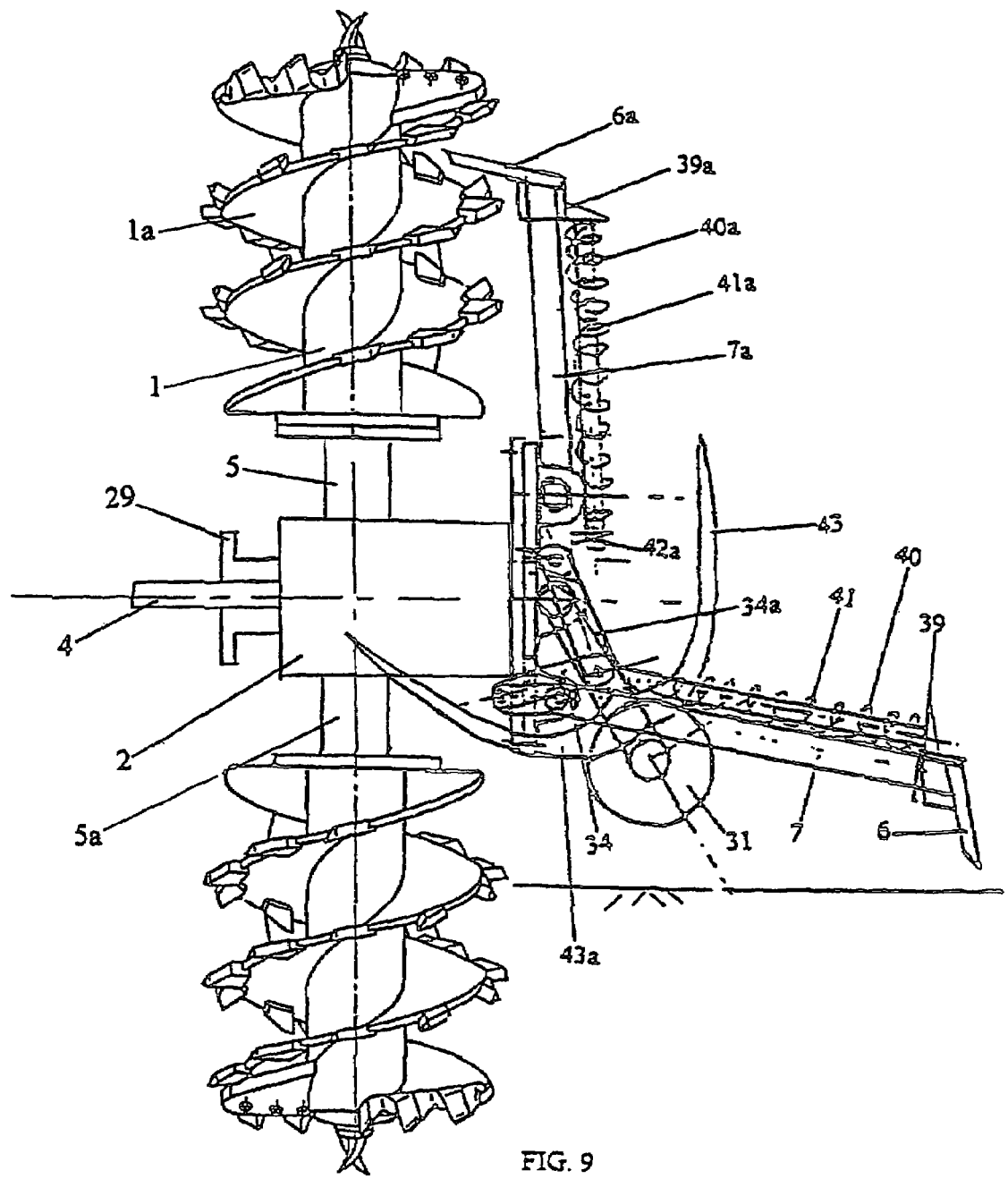
FIG. 9 is a rear view of two auger diggers mounted on a rolling gear-box, one in its digging position with one stationary leaning blade at its side above the ground and the other in its upper position with a stationary-cleaning blade at its side in a cleaning position.

FIG. 9 is a rear view of two rotating auger diggers 1 and 1*b* mounted on a rolling gearbox 2. One rotating digger 1 is in its digging position with one stationary-cleaning blade 6 at its side above the ground and the other 1*b* in its upper position with a stationary-cleaning blade 6*a* at its side in a cleaning position. The mass 31 is in its lower position lifting up the lower stationary-cleaning blade 6 and pushing the upper stationary-cleaning blade 6*a* to the upper rotating auger digger 1*b* to clean the mud. By moving forward the gearbox 2 with the auger diggers 1 and 1*b* will roll with the rolling hollow shaft 15 as the flange 29 is mounted on it. The auger diggers 1 and 1*b* rotate as the vehicle engine powers them by the transmission and the inlet shaft 4. The lower rotating auger 1 penetrates the soil to dig the clean hole, while the upper rotating digger 1*b* is being cleaned. The base plate 13 rolls with the gearbox 2 thus letting the mass 31 to change positions by gravity, always lifting the lower stationary-cleaning blade 6 above the ground and pushing the upper stationary-cleaning blade 6*a* to the rotating upper auger digger 1*a*. The curved rails 43 and 43*a* are for pushing the cleaning blade 6 or 6*a* out of the digger flights 1*a* as was explained earlier.

Figure 10:
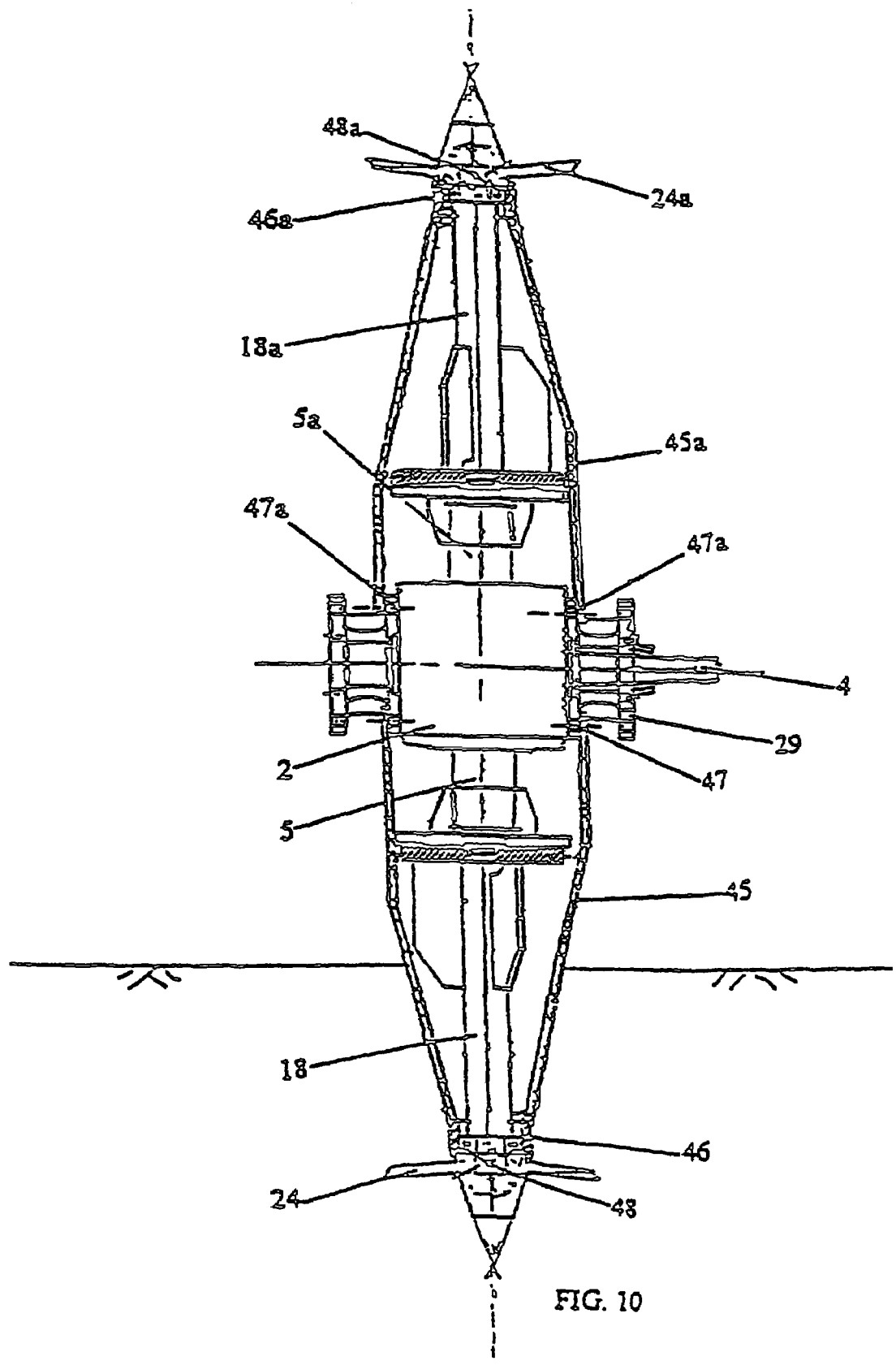
FIG. 10 is a rear view of two spot cultivator shafts, one in its digging position and the other in its upper position, both of them with stationary sleeves around the cultivating shafts and one set of cultivating blades at their ends.

FIG. 10 is a rear view of two rotating spot cultivator shafts 18 and 18*a*. Shaft 18 is in its digging position and shaft 18*a* is in its upper position, both of them with stationary sleeves 45 and 45*a* around the cultivating shafts and one set of rotating cultivating blades 24 and 24*a* at each of their ends. The sleeves 45 and 45*a* are connected to the gearbox 2 by bolts 47 and 47*a* to prevent them from rotating with the cultivator shafts 18 and 18*a*. On their other side the sleeves 45 and 45*a* are connected to the bearing housings 46 and 46*a*. The bearings allow the cultivator shafts 18 and 18*a* to rotate while the sleeves 45 and 45*a* prevent the build-up of mud around the shafts while they are cultivating the soil in their downward position. For assembling, the two sets of the cultivating blades 24 and 24*a* are mounted to the shafts 18 and 18*a* after mounting the sleeves 45 and 45*a* to their place with the bearings 46 and 46*a*. In order to secure the blades 24 and 24*a* to the shafts 18 and 18*a*, hollow pins 48 and 48*a* are pushed inside them after mounting.

Figure 11:
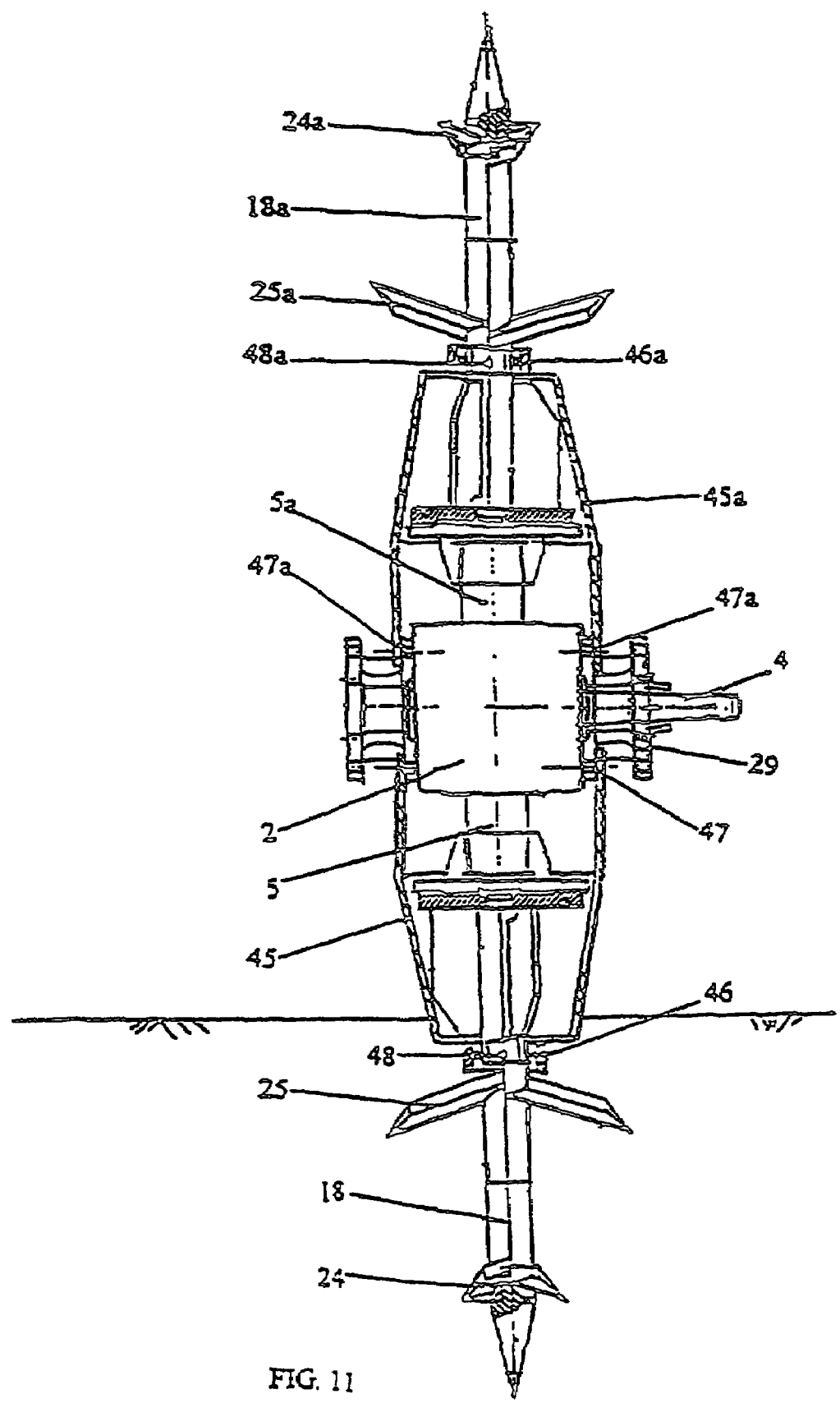
FIG. 11 is a rear view of two spot cultivator shafts, one in its digging position and the other in its upper position, both of them with stationary sleeves around the cultivating shafts and two sets of cultivating blades at their ends at different depths.

FIG. 11 is a rear view of two spot cultivator shafts 18 and 18*a*. Shaft 18 is in its digging position and shaft 18*a* is in its upper position, both of them with stationary sleeves 45 and 45*a* around the cultivating shafts and two sets of cultivating blades at their ends at different depths 24 and 25 on shaft 18 and 24*a* and 25*a* on shaft 18*a*. The sleeves 45 and 45*a* are connected to the gearbox 2 by bolts 47 and 47*a* to prevent them from rotating with the cultivator shafts 18 and 18*a*. On their other side the sleeves 45 and 45*a* are connected to the bearing housings 46 and 46*a*. The bearings allow the cultivator shafts 18 and 18*a* to rotate while the stationary-sleeves 45 and 45*a* prevent the build-up of mud around the shafts above the blades 25 and 25*a* while they are cultivating the soil in their downward position. For assembling, the two sets of the cultivating blades 24 with 25 and 24*a* with 25*a* are mounted to the shafts 18 and 18*a* after mounting the sleeves 45 and 45*a* to their place with the bearings 46 and 46*a*. In order to secure the blades 24 with 25 and 24*a* with 25*a* to the shafts 18 and 18*a*, hollow pins 48 and 48*a* are pushed inside them after mounting.

Figure 12:
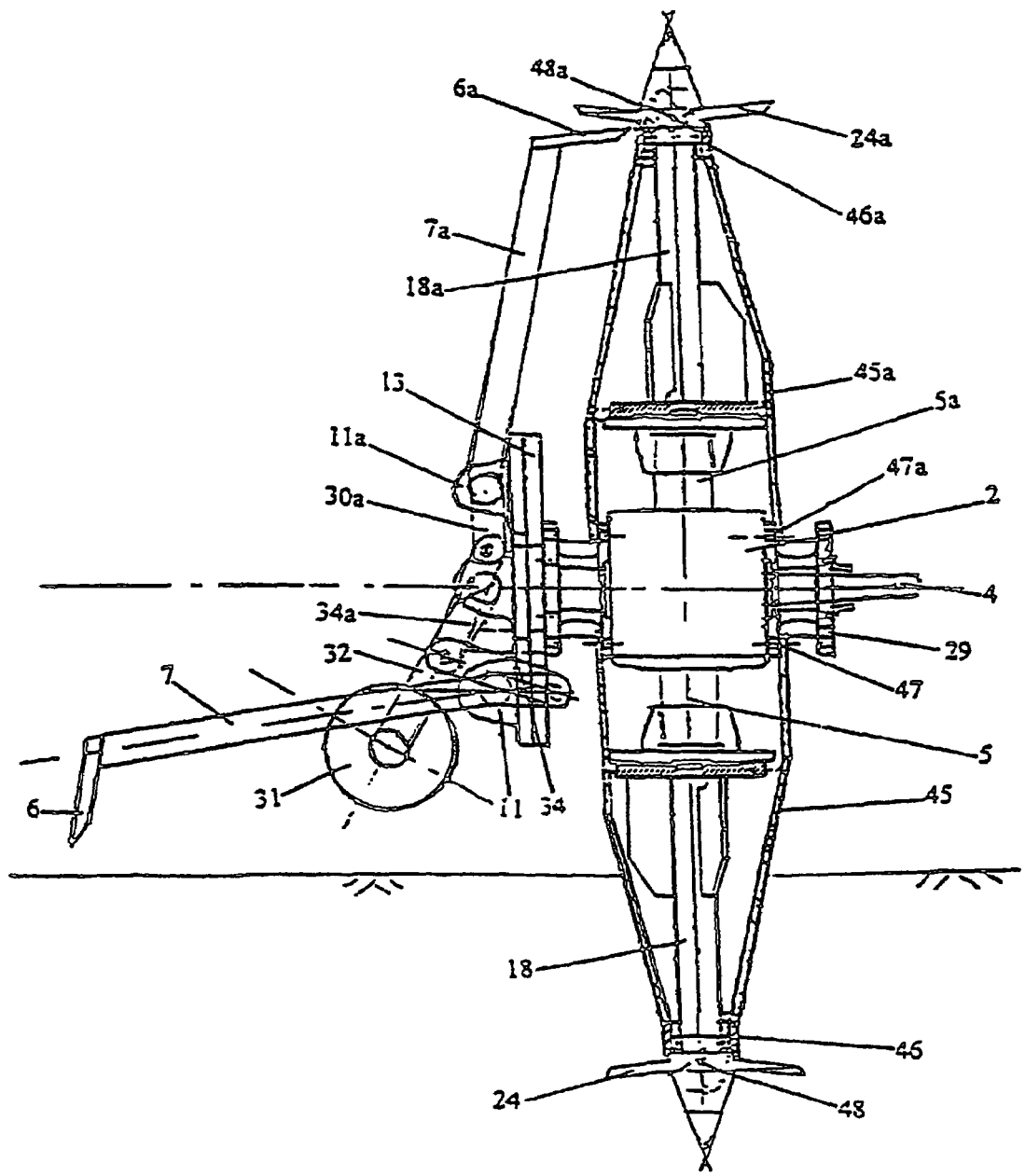
FIG. 12 is a rear view of two spot cultivator shafts, one in its digging position with its stationary-cleaning blade above the ground. The other in its upper position with its stationary-cleaning blade in a cleaning position, both of them with stationary sleeves around the cultivating shafts and one set of cultivating blades at their ends.

FIG. 12 is a rear view of two rotating spot cultivator shafts 18 and 18*a*. Shaft 8 is in its digging position with its stationary-cleaning blade 6 above the ground. Shaft 18*a* is in its upper position with its stationary-cleaning blade 6*a* in a cleaning position, both of them with stationary sleeves 45 and 45*a* around the cultivating shafts 18 and 18*a* and one set of cultivating blades 24 and 24*a* at their ends. The mass 31 is downward, lifting the stationary-cleaning blade 6 above the ground and pushing the stationary-cleaning blade 6*a* to clean the blades 24*a*.

Figure 13:
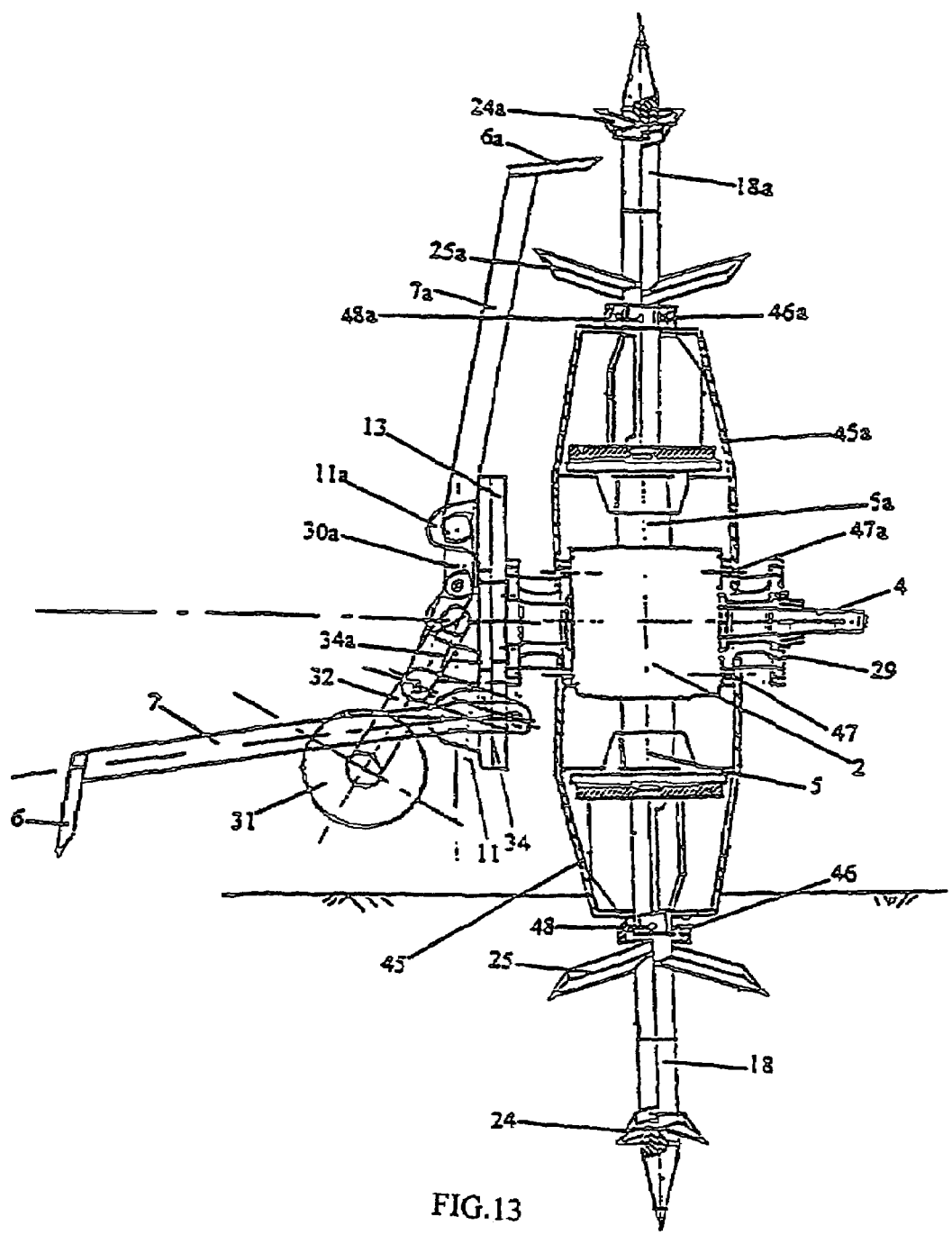
FIG. 13 is a rear view of two spot cultivator shafts, one in its digging position with its stationary-cleaning blade above the ground. The other in its upper position with its stationary-cleaning blade in a cleaning position, both of them with stationary sleeves around the cultivating shafts and two sets of cultivating blades at their ends at different depths.

FIG. 13 is a rear view of two rotating spot cultivator shafts 18 and 18*a*. Shaft 18 is in its digging position with its cleaning blade 6 above the ground. Shaft 18*a* is in its upper position with its stationary-cleaning blade 6*a* in a cleaning position. The rotating cultivating shafts 18 and 18*a* are covered with stationary sleeves 45 and 45*a* around them. Two sets of cultivating blades are mounted at the ends of the rotating shafts at different depths 24 and 25 on shaft 18 and 24*a* and 25*a* on shaft 18*a*. The mass 31 is downward, lifting the stationary-cleaning blade 6 above the ground and pushing the stationary-cleaning blade 6*a* to clean the blades 24*a* and 25*a*.

Figure 14:
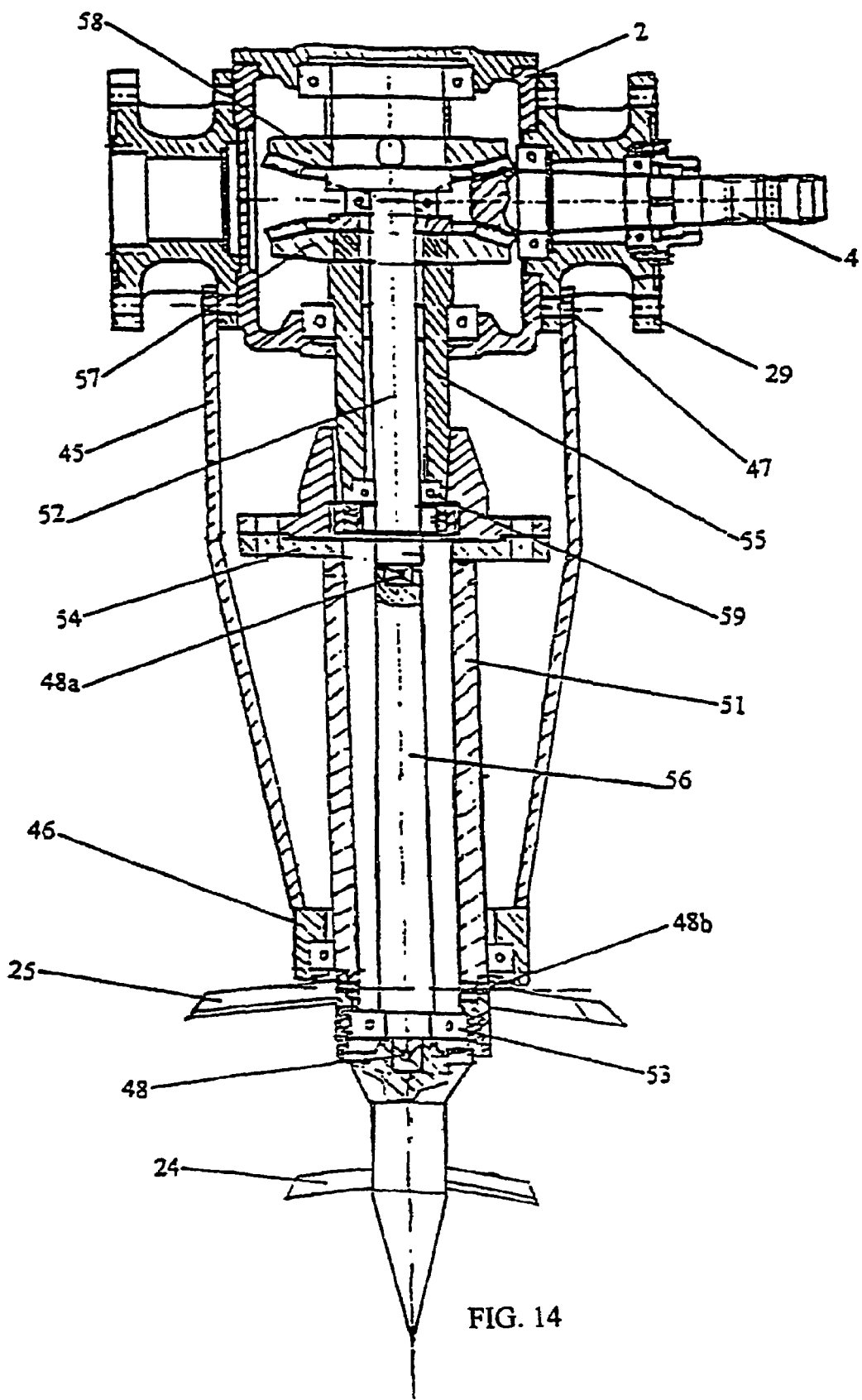
FIG. 14 is a rear view of a spot cultivator shaft mounted on a rolling gearbox, in its digging position with two sets of blades. The upper set of blades is rotating in one direction while the lower set is rotating to the other direction. The shaft above the upper set of blades is covered with a stationary sleeve around it.

FIG. 14 is a rear view of a spot cultivator shaft mounted on a rolling gearbox 2, in its rotating digging position with two sets of blades 24 and 25. The upper set of blades 25 is rotating in one direction while the lower set of blades 24 is rotating to the other direction. The hollow shaft 51 above the upper set of blades 25 is covered with a stationary sleeve 45 around it. The in-corning shaft 4 by its pinion is rotating two gears, one of them 57 in one direction, and the other one 58 in the counter direction. The flange 29 is mounted to the rolling hollow shaft 15, thus rolling the gearbox 2 with the hollow shaft in a vertical plane forward. The gear wheel 57 is connected to the hollow shaft 55 and rotates it in one direction, and gear wheel 58 is connected to the inner shaft 52 and rotates it to the counter direction while being held by the bearing 59. The hollow shaft 51 is mounted to the hollow shaft 55 by flanges 54 to rotate with it. The upper set of blades 25 is mounted to the hollow shaft 51 by the hollow pins 48*b* around it and rotates with it in one direction. The stationary sleeve 45 is mounted to the rolling gearbox 2 by bolts 47 and connected at its other lower end to the bearing housing 46. The inner shaft 56 is mounted to the inner shaft 52 and secured by the hollow pin 48*a*, to rotate with it. The lower set of blades 24 is mounted to the inner shaft 56 and secured to it by the hollow pin 48, and rotates with it in the counter direction to the upper set of blades 25, thus preventing the mud from accumulating between them.

Figure 15:
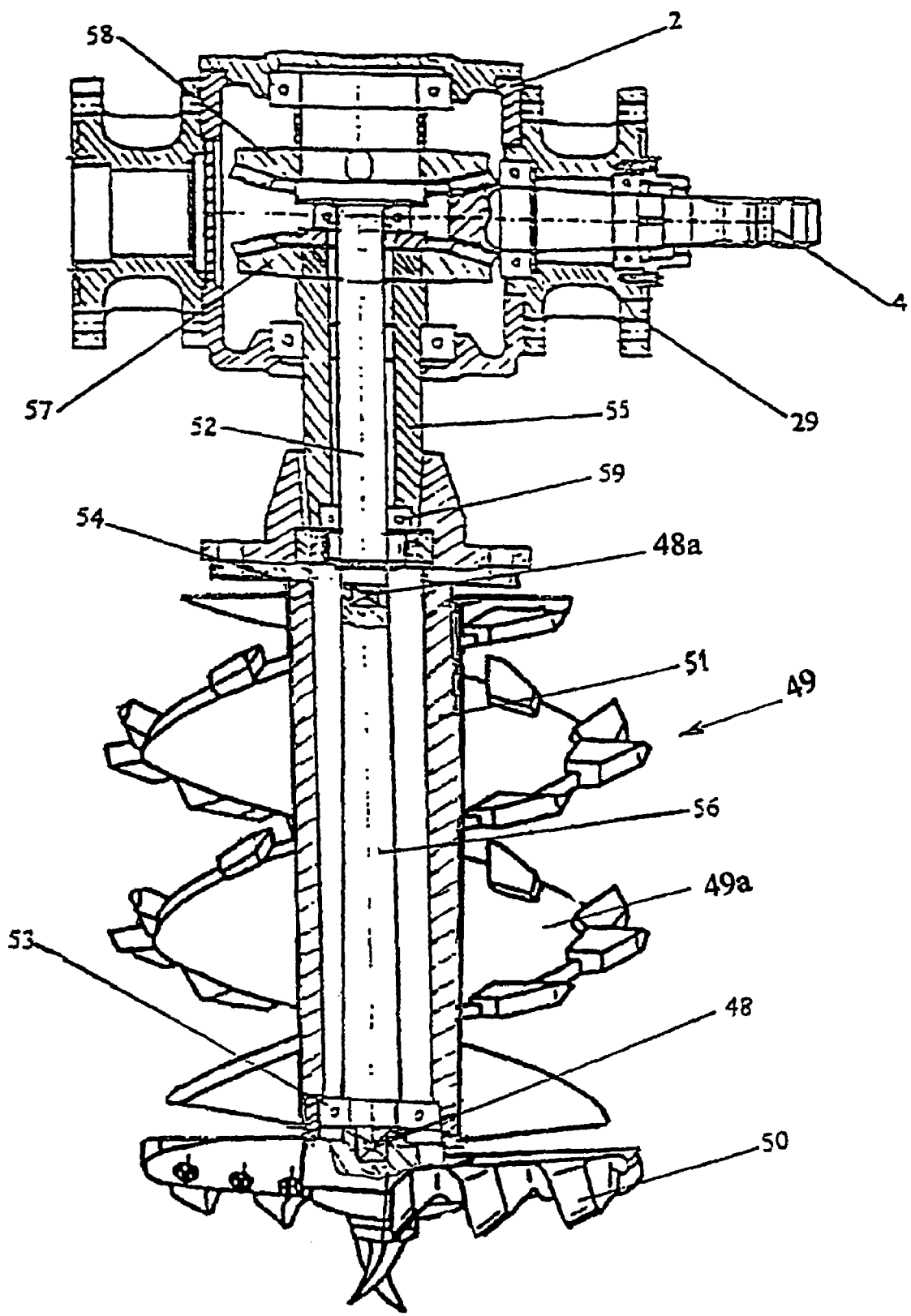
FIG. 15 is a rear view of an auger digger mounted on a rolling gearbox, in its digging position. The auger flights are rotating in one direction while the lower set of blades is rotating to the other direction.

FIG. 15 is a rear view of an auger digger 49 mounted on a rolling gearbox 2, in it's digging position. The auger digger 49 comprises an auger flights 49*a* and blades 50. The auger flights 49*a* are rotating in one direction while the lower set of blades 50 is rotating to the other direction. The in-coming shaft 4 by its pinion is rotating two gears, one of them 57 in one direction, and the other one 58 in the counter direction. The flange 29 is mounted to the rolling hollow shaft 15 (not shown here), thus rolling the gearbox 2 with the hollow shaft 51 with the auger flights 49*a* on it in a vertical plane forward. The gear wheel 57 is connected to the hollow shaft 55 and rotates it in one direction, and gear wheel 58 is connected to the inner shaft 52 and rotates it to the counter direction while being held by the bearing 59. The hollow shaft 51 is mounted to the hollow shaft 55 by flanges 54 to rotate with it. The auger flights 49*a* are welded to the hollow shaft 51 and rotate with it in one direction. The inner shaft 56 is mounted to the inner shaft 52 and secured by the hollow pin 48a, to rotate with it. The lower set of cutting blades 50 is mounted to the inner shaft 56 and secured to it by the hollow pin 48, to rotate with it in the counter direction to the upper auger flights 49a. The lower set of cutting blades 50 is cutting and pulverizing the soil while the upper auger flights 49a, rotating to the other direction, prevent the accumulation of mud and lift the pulverized soil out from the hole.

Figure 16:
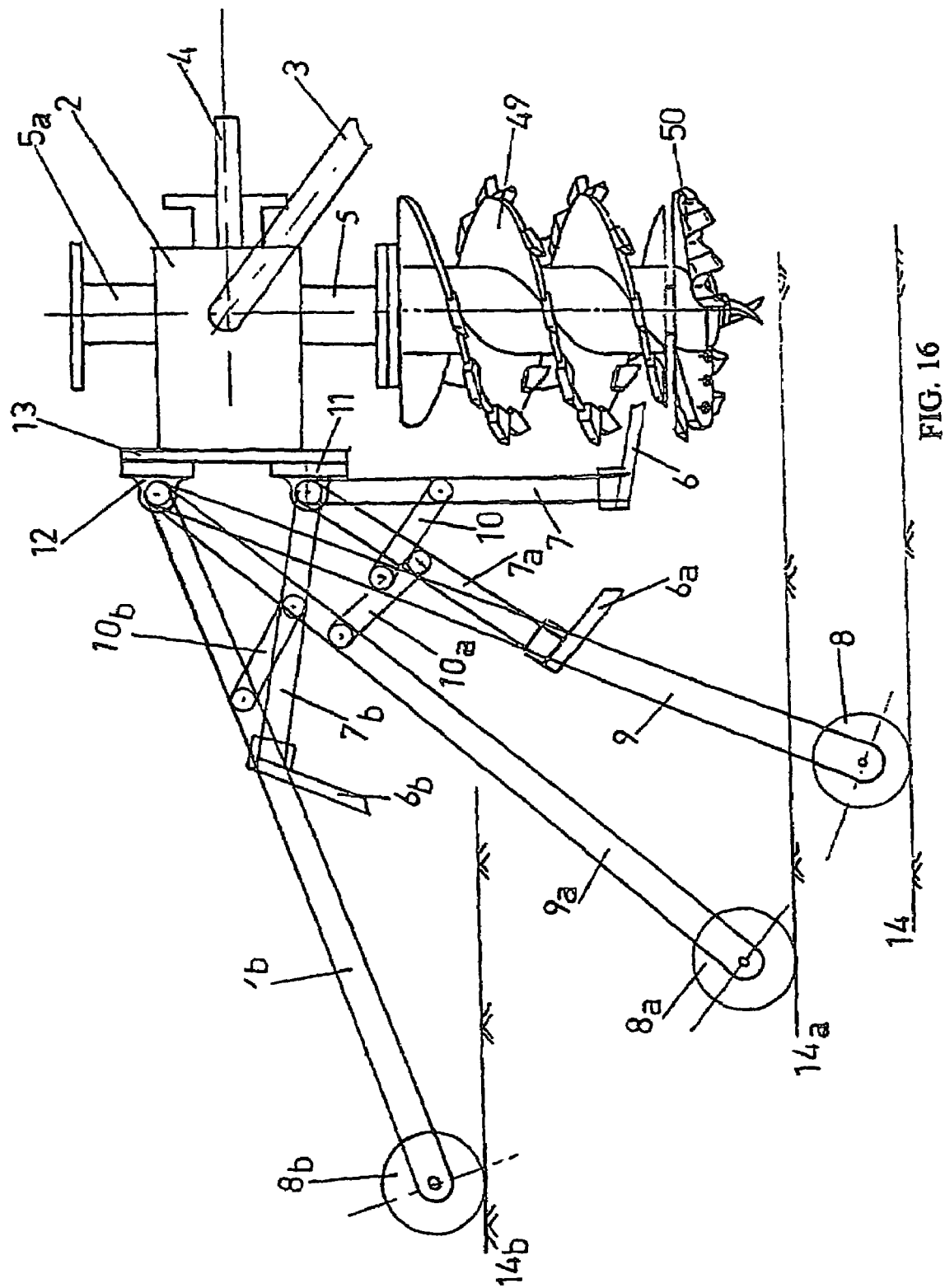
FIG. 16 is a side view of a post hole digger with an automatic stationary-cleaning blades in three positions of operation. The auger flights are rotating in one direction while the lower set of blades is rotating to the other direction.

FIG. 16 is a side view of a post hole digger with an automatic cleaning blades in three positions of operation. The auger flights 49a are rotating in one direction while the lower set of blades 50 is rotating to the other direction. The counter rotation effect is explained in FIG. 14. The automatic stationary cleaning blades system is explained in FIG. 1. The words "mud" and soil are used herein substantially interchangeable; both contain some water, with mud being soil containing a relatively larger amount of water which generally makes it more adherent to tool surfaces.

The invention claimed is:

1. A method of cleaning hole diggers and spot cultivators comprising:
    moving a hole digger or a spot cultivator having at least one digging or tilling shaft and having at least one cleaning blade positioned close to the shaft while the shaft is being lifted or rolled out of the soil with a mud and/or a debris adhered thereto,
    cleaning the mud and/or debris from said at least one digging or tilling shaft with said at least one cleaning blade;
    maintaining said at least cleaning blade above the ground after the at least one digging or tilling shaft is lowered to dig the soil;
    controlling the place of the at least one cleaning blade to be close to the at least one digging or tilling shaft to clean it from mud and/or debris while being lifted or rolled out of the soil, and when the at least one digging or tilling shaft is lowered to dig the soil, moving said at least one cleaning blade away from said digging or tilling shaft, lift and maintain said at least cleaning blade above the soil.

2. A method of preventing the accumulation of mud or debris on the tilling shaft of spot cultivators comprising:
    moving the spot cultivator having at least one rotating tilling shaft which is also rotatable about a longitudinal axis thereof and having at least one tilling element extending from said at least one rotating tilling shaft and rotating with said shaft, covering said at least one tilling shaft in an axial direction inward of said at least one tilling element with a sleeve which closely surrounds the outward end of said tilling shaft at a position inward of said at least one tilling element to prevent the accumulation of mud or debris on the said shaft, wherein said sleeve is non rotating relatively to the at least one tilling shaft.

3. A method of cleaning hole diggers and spot cultivators comprising:
    moving a hole digger or a spot cultivator having at least one digging or tilling shaft including at least one cutting blade at its digging end, and having (i) at least one tilling blade or (ii) an auger flight, positioned inward of said at least one cutting blade, and
    rotating said at least one cutting blade in the opposite direction to the rotation direction of said at least one tilling blade or said auger flight, to cut the debris and prevent or minimize accumulation of debris or mud on said blades.

4. A traveling rolling digger for sequential hole drilling or for producing sequential cultivated spots in soil, the traveling rolling digger comprising:
    at least one drilling shaft which is rotatable by a drive mechanism about a longitudinal shaft axis and having a rotating soil penetrating edge, said at least one drilling shaft having at least one drilling or tilling blade affixed thereto and positioned toward the end of said shaft;
    said at least one drilling shaft being mounted to roll about a horizontal shaft in a soil penetrating plane while said horizontal shaft moves in a direction of travel of the traveling rolling digger, whereby said at least one rotating drilling shaft enters the soil at an entry angle and digs into the soil while the horizontal shaft moves in said direction of travel and the drilling shaft continuously changes its angle relative to the soil from the entry angle to a vertical position, then to backward angle and exits the soil with mud and/or debris adhering thereto,
    at least one cleaning blade for cleaning said at least one hole digger or spot cultivator, after said at least one hole digger or spot cultivator exits the soil, said at least one cleaning blade cleans the mud and/or debris whereby said digger is ready for digging the next hole/or spot, and
    means to move said at least one cleaning blade into contact with said mud and/or debris after said at least one hole digger or spot cultivator exit the soil, and to move said at least one cleaning blade out of contact with said at least one hole digger or spot cultivator before it starts to dig the next hole or spot.

5. The traveling rolling digger of claim 4, wherein the at least one cleaning blade is mounted on a main gearbox of rolling digger by a pivot arm.

6. The traveling rolling digger of claim 4, said means comprising a depth-gage wheel or sledge said wheel is running on the ground surface at the rear side of the gearbox, and said wheel or sledge is mounted to the main gearbox by another pivot arm, and wherein said gage wheel or sledge is moving forward and pushing the at least one stationary cleaning blade to the rotating digging shaft.

7. The traveling rolling digger of claim 6, wherein two pivot arms are linked in such a way that the cleaning blade is pulled backwards and maintained above the ground when the digging shaft enters the soil.

8. The traveling rolling digger of claim 4, wherein said means to move comprising a mechanism for changing the at least one cleaning blade positions and to push the at least one cleaning blade to the digger in its upward position and to lift it above the ground in the digging position, said mechanism comprising a counterweight and pivot arms and is mounted at the side of the rolling gearbox of the machine and rolls with it.

9. The traveling rolling digger of claim 8, wherein the counterweight is mounted on at least one pivoted arm, which lets it fall downward whenever the gearbox rolls around its horizontal axes which rolls the digger shaft upward after digging the hole.

10. The traveling rolling digger of claim 9, wherein the at least one pivot arm of the counterweight is linked to the at least one pivot stationary arm of the at least one cleaning blade so that it lifts the arm and the blades above the ground in the digging position of the digger and in the upper position of the digger the counterweight pushes the arm and the cleaning blade(s) inward to the rotating digger whereby the digger is being cleaned after each hole and is ready to dig the next hole.

11. The traveling rolling digger of claim 9, wherein to clean an auger-digger, the at least one cleaning blade being slidable along its pivoted arm and as the cleaning blades enter between the auger's flights, they are being pushed by the flights to their ends sliding along the pivoted arm.

12. The traveling rolling digger of claim 11, wherein the cleaning blade(s) with their arms are pushed out of the cleaned auger flights by a cam rotating with the auger.

13. The traveling rolling digger of claim 9, wherein to clean an auger-digger, the at least one cleaning blade being slideable along its pivoted arm pushing a rod against a spring, and as the cleaning blades enter between the auger's flights, they are being pushed by the flights to their ends, and wherein the rod pushes and slides along a curved rail, said curved rail is mounted on the arm of the counterweight and lifts the counterweight upward, which results in pulling the blades with their arms out of the auger flights, and wherein the spring slides back the at least one cleaning blade and the rod to its starting cleaning position as the mass moves downward.

14. The traveling rolling digger of claim 4 wherein said at least one drilling rotatable shaft is covered by a nonaxially rotating covering sleeve, one end of said covering sleeve is mounted on a main gear box of the traveling rolling digger and the other end of said sleeve extends toward and is mounted inward of said at least one drilling or tilling blade, thereby preventing build up of mud and debris along said portion of said drilling shaft which is covered by said sleeve.

15. A traveling rolling digger for producing sequential holes or cultivated spots in soil, the traveling rolling digger comprising:
   at least one drilling shaft having at least one drilling or tilling blade positioned toward the end of said shaft which is rotatable by a drive mechanism about a longitudinal shaft axis and having a rotating soil penetrating edge;
   said at least one drilling shaft being mounted to roll about a horizontal shaft in a soil penetrating plane while said horizontal shaft moves in a direction of travel of the traveling rolling digger, whereby said at least one rotating drilling shaft enters the soil at an entry angle and digs into the soil while the horizontal shaft moves in said direction of travel and the drilling shaft continuously changes its angle relative to the soil from the entry angle to a vertical position, then to backward angle and exits the soil, wherein
   said at least one drilling rotating shaft is covered by a non-axially rotating covering sleeve, one end of said covering sleeve is mounted on a main gearbox of the traveling rolling digger and the other end of said covering sleeve is positioned inward of said at least one drilling or tilling blade and closely surrounds said shaft to prevent accumulation of mud and debris around said covered shaft.

16. The traveling rolling digger of claim 15 further comprising
   at least one cleaning blade for cleaning said at least one rotating drilling shaft after said at least one rotating drilling shaft exits the soil, said at least one cleaning blade cleans the mud and/or debris from a portion of said at least one rotating drilling shaft which is positioned between said soil penetrating edge and the outward end of said covering sleeve.

17. A traveling rolling digger for sequential hole drilling or for producing sequential cultivated spots in soil, the traveling rolling digger comprising:
   a hole digger or a spot cultivator having at least one digging or tilling shaft including at least one cutting blade at its digging end, and having (i) at least one tilling blade or (ii) an auger flight, positioned inward of said at least one cutting blade, and
   said at least one cutting blade rotates in the opposite direction to the rotation direction of said at least one tilling blade or said auger flight, to cut the debris and prevent or minimize accumulation of debris or mud on said blades and the shaft between them.

* * * * *